United States Patent [19]

de Buda

[11] Patent Number: 4,565,794
[45] Date of Patent: Jan. 21, 1986

[54] PRODUCTION OF SILICA GEL AND AN ADSORBENT, ABSORBENT PRODUCT FROM SERICITIC CLAY

[75] Inventor: Francis de Buda, Santa Barbara, Calif.

[73] Assignee: John Stephens, Santa Barbara, Calif.

[21] Appl. No.: 562,426

[22] Filed: Dec. 16, 1983

[51] Int. Cl.[4] .......................... B01J 20/12; B01J 20/10
[52] U.S. Cl. ...................................... 502/83; 204/133; 502/82; 502/81; 502/233; 502/408
[58] Field of Search ............... 423/131, 132, 338, 332; 252/315.5; 502/80, 81, 83, 82, 232, 233, 408; 204/129, 130, 133

[56] References Cited

U.S. PATENT DOCUMENTS

| | | | |
|---|---|---|---|
| 541,147 | 6/1895 | Blackman | 204/133 |
| 1,932,832 | 10/1933 | Turrentine | 502/408 |
| 2,495,751 | 1/1950 | Mills et al. | 502/83 X |
| 3,446,727 | 5/1969 | Secor | 502/83 X |
| 3,617,215 | 11/1971 | Sugahai et al. | 502/83 X |
| 3,652,215 | 3/1972 | Aboutboul et al. | 423/338 |
| 3,716,493 | 2/1973 | Acker et al. | 423/338 X |
| 3,818,718 | 5/1967 | Beamesderfer et al. | 502/83 X |
| 3,838,192 | 9/1974 | Bertorelli et al. | 423/332 X |
| 4,235,751 | 11/1980 | Del Pesco | 502/83 X |

Primary Examiner—Andrew H. Metz
Assistant Examiner—Nam X. Nguyen
Attorney, Agent, or Firm—Edward D. O'Brian; K. H. Boswell

[57] ABSTRACT

Sericitic clays can be treated so as to produce silica gel and an adsorbent, absorbent product capable of being utilized in many different applications. In treating such clays to produce such products, finely ground clay particles are digested with an alkali so as to produce an alkali silicate solution which is separated from the remaining inorganic material. The latter is digested with an acid so as to remove alumina values. The particles remaining should then be washed and dried prior to being used as an adsorbent, absorbent material. The alkali silicate solution is preferably subjected to electrolysis to bleach contaminants within the solution and then treated with an acid so as to gel the silicate. After the gel is formed, the gel and the solution are neutralized. The gel is then separated and dried.

9 Claims, 1 Drawing Figure

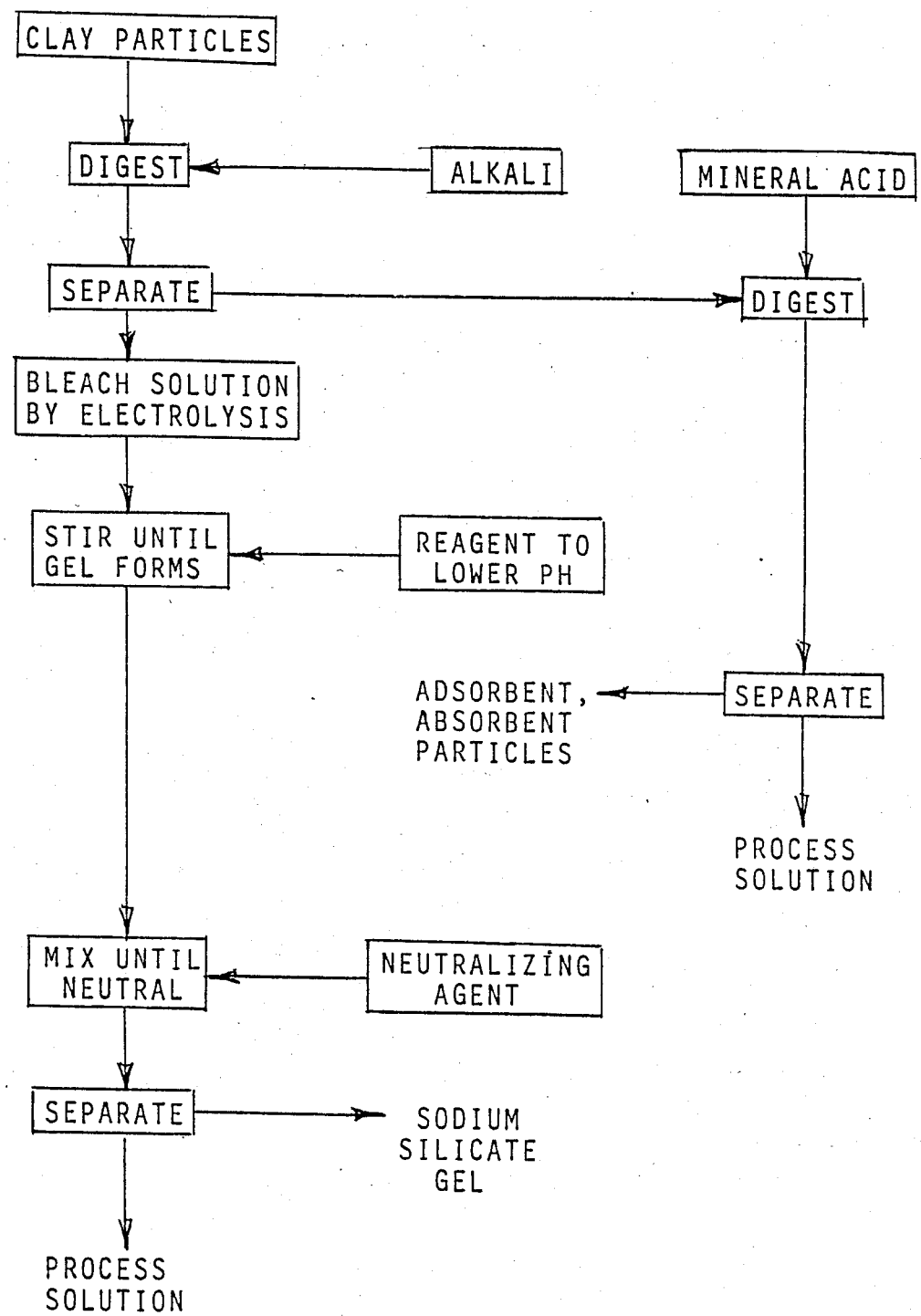

PRODUCTION OF SILICA GEL AND AN ADSORBENT, ABSORBENT PRODUCT FROM SERICITIC CLAY

BACKGROUND OF THE INVENTION

The invention set forth in this specification relates to the production of silica gel and an adsorbent, absorbent product from sericitic clay.

The term "sericitic clay" used in the title of this specification is intended to indicate a micaceous mineral normally containing a small amount of montmorillonitic type material. Normally, the latter is not a true or traditional montmorillonite because it does not have the expansion characteristics montmorillonite on glycolation. In the particular sericitic clays which are intended to be utilized in connection with the practice of this invention, the sericitic material will normally contain some crystoballite and will also contain a comparatively limited or minor amount of opaline quartz as impurities.

Normally, a sericitic clay of the type indicated in this discussion will contain of from about 40 to about 60% by weight of easily solubilized, amorphous silica. Such silica will either be uncombined or free or will be combined with other oxides so loosely that it can be extracted from the clay by the same methods as can be used in removing uncombined silica. A sericitic clay of the type used with the invention will also normally contain some alumina which is either uncombined or present within compounds which can be so easily broken up so that the alumina present within them can be removed with the same steps as are used to remove free or uncombined alumina. Some of the alumina and the silica will, of course, also be present in the form of zeolitic type compounds which cannot be as easily broken down. Such zeolitic compounds will usually contain various other ingredients such as magnesia, calcium oxide, iron oxides, sodium, lithium and or potassium oxide.

Clays of the type indicated in this discussion can be found in various different locations. In general, all of such clays will have oxide analyses which are substantially similar in character but which will vary slightly from deposit to deposit. Such a typical analysis for a clay of this type mined in the San Joaquin Valley of California in the vicinity of towns such as Taft, McKittrick and others is as follows:

| | |
|---|---|
| Silica | 80.40% |
| Aluminum Oxide | 9.48% |
| Iron Oxide | 0.88% |
| Calcium Oxide | 0.20% |
| Magnesium Oxide | 0.54% |
| Sodium & Potassium Oxides | 0.15% |
| Loss on ignition (largely combined water) | 8.35% |
| | 100.00% |

Normally, seritic clays of the type indicated in this discussion will not contain greater than 10% more or less by weight of any of the ingredients noted.

Sericitic clays as indicated are in and of themselves comparatively inexpensive and they are commonly utilized for a variety of different, diverse purposes. At present, small chunks or lumps of these clays are utilized as cat litter. Comparatively large amounts of comparatively fine particles are left over from the processing of these clays so as to form such lumps or chunks. Up to the present, such fine particles of sericitic clays have represented an economic waste.

It is considered that such fines cannot be suitably used in many different applications and, as a consequence, they represent an essentially economic waste. A quest for an economic utilization of such fines has resulted in the realization and discovery that they can be processed so as to provide silica gel and an adsorbent, absorbent product believed to have significant utility in various applications such as, for example, in purifying oils, wines and various other liquids. The fact that the invention has been intended to be utilized with "left over" fines of sericitic clay is not to be taken as indicating that the invention cannot be used with clay mined specifically so that it can be processed in accordance with this invention.

BRIEF SUMMARY OF THE INVENTION

It is believed that it will be apparent from the preceding that this invention is intended to provide a new and improved process for treating sericitic clays so as to produce both silica gel and an adsorbent, absorbent product capable of being utilized wherever there is a need to utilize a material having such adsorbent, absorbent characteristics. The invention is also intended to provide a process as noted which may be easily and conveniently carried out utilizing conventional or known equipment. A further objective of the present invention is to provide the process as noted which is particularly economic in that it can be utilized with fines resulting from the processing of sericitic clays for other purposes such as in the treatment of it so as to make cat litter. The invention is further intended to provide an adsorbent, absorbent material which is particularly effective in removing color and odor from various types of liquids.

In accordance with this invention these various objectives are achieved by providing a process of treating sericitic clay which comprises: digesting such clay with an alkali, preferably sodium hydroxide, under such conditions as to remove from the clay any free or not strongly combined silica as soluble sodium silicate, then separating the process alkali silicate solution from the remaining particles, bleaching this process solution, preferably by decomposing some of the water within it by electrolysis, gelling the alkali silicate in the bleached solution, separating the gel from any free liquid present so as to recover it, further digesting the solids from the initial digestion with a mineral acid under such conditions as to place in the solution any free or uncombined alumina or any alumina present which can be removed by the same methods which can be used in removing uncombined alumina, and separating the process solution from the solids resulting so that the solids remaining can be used as an adsorbent, absorbent product and so that, if desired, the alumina values can be recovered from the solution employed in this latter digestion.

BRIEF DESCRIPTION OF THE DRAWING

This invention is best more fully explained with reference to the accompanying drawing in which:

The FIGURE is a flow sheet indicating the steps of the presently preferred manner of carrying out the process of this invention.

DETAILED DESCRIPTION

In carrying out this invention it is preferred to utilize as the starting material sericitic clay particles which are as fine as can be obtained without significant or expensive grinding or similar pulverization of the clay material. This is one reason why it is advantageous to utilize the present invention in treating so-called "fines" of sericitic clay which are by-products of the manufacture of other products such as cat litter. It is preferred to use comparatively small particles since such particles have a greater surface area per unit of weight than larger sized particles. As a consequence of this, they have a greater amount of surface area available per unit of weight where reactions can occur in carrying out the digestion steps of the process of this invention.

It is considered that particles which are +150 mesh standard Tyler screen size are not paticularly desirable for use with the invention because of the limited surface area of such particles but it is also recognized that such particles can be treated in accordance with the process of this invention although the yields achieved with them are not as desirable as the yields achieved when finer particles are used although the properties of the final solid product may be slightly less acceptable than if fiber particles were used. It is considered that the maximization of the removal of silica and alumina from such particles within limited time periods will occur when the particles used are −325 mesh standard Tyler screen size.

In carrying out the first step of this invention, these particles are admixed with an alkali solution for a time and at a temperature sufficient so as to place in the solution substantially all free or uncombined silica and substantially all silica present which is chemically bound with other oxides in compounds of such a "loose" character that the silica can be removed from them along with chemically uncombined silica. This first step of the process should not, however, be carried out with a sufficiently concentrated alkali solution or under such conditions that the comparatively complex mineral-like, normally somewhat zeolitic like compounds present in the clay containing silica will be attacked to any significant or noticeable extent. This is quite important because such compounds are the primary compounds remaining in the adsorbent, absorbent product resulting from the process of this invention.

Because of the fact that what may be regarded as only a limited amount of silica within the clay is to be removed during this first step, it is referred to carry out this first step by digesting the fine particles with a comparatively dilute alkali solution so as to form a sodium silicate containing process solution. Because of cost and availability, the preferred alkali for use in this step is sodium hydroxide but, of course, if desired the related lithium or potassium hydroxides can be substituted for it. The concentration of such an alkali solution will normally be varied depending upon the temperature of the mixture during this first digestion and the intended time that the particles will be in contact with the alkali solution during this first digestion. These various factors essentially are of an economic character.

In general, it is considered preferable to use a comparatively weak alkali solution rather than a comparatively strong solution because of the cost of the alkali and because of the fact that it is comparatively inexpensive to heat a process mixture so as to expedite the silica removal. It is considered at this time that it is effective to utilize a process solution containing from about 1 to about 4% of sodium hydroxide by weight and the preferred results from an economic standpoint are achieved by using about 2% by weight of the sodium hydroxide in the treatment solution. This solution should preferably be held at as hot a temperature as is conveniently practical as it is in contact with the particles.

Presently, it is considered that effective results with solutions of the concentrations indicated in removing silica within a reasonable amount of time without tying up equipment unnecessarily because of a prolonged reaction time can be achieved by keeping the reaction mixture at a temperature of at least 70° C. but it is preferred to keep the reaction material at about 100° C. or slightly above. When the latter temperature is used, substantially complete removal of the free or uncombined and loosely combined silica can be obtained in about 5 minutes. In general, reaction times of from 2 to about 10 minutes can be employed when other factors as noted are varied.

The total amount of the alkali solution used of course should be related to the amount of free or uncombined silica to be removed when it is theorized that all of this silica enters into the compound sodium metasilicate. In general, it is considered that the amount of the alkali present should be slightly in excess of the stoichiometric quantity required in order to accomplish this objective but should not be in excess of about 50% by weight over the stoichiometric amount needed. This minimizes the chances of any alkali in excess of that needed to remove free or uncombined silica being available to attack those compounds which are not to be removed during this first digestion step. In connection with this, it is noted that a multiplicity of sodium silicate compounds are presumably formed during this first digestion step.

After this first digestion step, the reaction mixture is separated in a conventional manner as, for example, through the use of a centrifuge into a liquid fraction and a paste-like solid fraction containing a minor amount of entrained processed solution. As subsequently noted, this solid or paste-like fraction will then be treated as to recover alumina values and to produce the final adsorbent, absorbent product.

The process liquid separated after the initial digestion will normally be of a somewhat off-white, brownish type color suggesting discoloration by hydrocarbon type complex organic chemicals. Because of the fact that this will result in discoloration of any silica gel produced from this liquid, it is considered necessary to bleach the process solution at this point in the process.

An important aspect of the present invention results from the discovery that it is possible to electrolize the process solution so as to produce significant amounts of hydrogen and oxygen in order to bleach this solution. At least the oxygen produced will react with the discolorants in the process solution so as to bleach the process solution to essentially a "clear" color. It is believed that it will be apparent from this that the voltage used during this electrolysis should be sufficient to decompose water and a total current used should be sufficient that hydrogen and oxygen are given off in a volume which is sufficient to agitate the liquid being electrolyzed so as to mix the reactants present.

The electrolytic apparatus used may, if desired, be equipped with conventional hoods to separate off the hydrogen and oxygen so that they may be separately recovered and used. During the electrolysis, the temperature of the process solution will be heated an amount corresponding to the total current used. Normally, this will be sufficient to expedite the bleaching reaction involved. Care must be taken to avoid heating to the point where the electrolysis apparatus might boil over. The time required will, of course, be sufficient to remove any discoloration of the solution. Normally, this will be from roughly 40 minutes to about 1 hour when an 8 volt current is used with sufficient amperage so that foaming of the electrolyte solution occurs.

The sodium silicate mixture within the process solution treated in the electrolysis apparatus is then preferably mixed in a conventional mixer with an appropriate reagent such as sulfuric acid or a similar reagent to lower its pH to a point that a sodium silicate gel will commence to form. It is believed at this time that the pH of this solution should be lowered to from about 3 to about 6 to expedite the formation of this gel. This gel will normally form at a normal ambient temperature of from about 18° to about 40° C. as a weak or easily broken gel as the solution is slowly stirred for a period of about 40 to about 60 minutes. The time period here can be varied significantly and will be determined by the effectiveness of the particular pH lowering agent added in promoting gelation and the degree to which the pH is lowered. The solution being treated should be held within this mixer for a sufficient period so that substantially all of the sodium silicate values are placed in the form of a physically weak gel.

Then ammonia or a different base should be added to the mixer so as to neutralize the acid present in the process solution. The stoichiometric amount of such a base should be used so as to make sure that both the gel and process solution are completely neutralized. It is preferred to utilize ammonia for this purpose and to use sulfuric acid as the pH lowering agent because of the fact that they will react to form ammonium sulfate, a compound useful as a fertilizer. The neutralization reaction involved here takes place in a small time period at normal ambient temperature.

After it is completed, the sodium silicate gel and the accompanying process solution are separated in a conventional manner as, for example, through the use of a centrifuge. The process solution containing the ammonium sulfate can then directly be used as fertilizer or can be boiled down in order to produce ammonium sulfate. The gel obtained in this manner should preferably next be dried at a moderate temperature which is insufficient so as to cause any sort of a chemical change in the gel until any entrained water present is removed. Any type of a conventional dryer can be used. It is considered preferable to use a dryer operated at a temperature from about 100° to about 250° C. although both higher and lower temperatures can be used.

The solid residue present in the form of a paste containing some process solution from the first digestion is preferably mixed with an aqueous mineral acid solution of a concentration capable of placing in solution substantially all free or loosely combined alumina values within the particles present without attacking mineral type compounds such as zeolite type compounds in which alumina is relatively firmly combined with other oxides. A number of different mineral acids may be utilized in this removal of free or loosely combined alumina values. It is considered preferable to utilize either sulfuric or hydrochloric acid because of the effectiveness of these acids as well as their availability and comparatively nominal cost. The first of these acids will convert the alumina present to aluminum chloride and will normally tend to place in solution minor amounts of ferrous and other oxides which are not firmly tied in various complex zeolitic type compounds. Sulfuric acid will of course tend to produce aluminum sulfate from the alumina present.

The concentration of the acid used should be sufficiently high to be effective in carrying out these reactions. It is considered that suitable results may be obtained using a sulfuric acid solution containing from about 50 to about 90% by weight of sulfuric acid or a hydrochloric acid solution containing about 12 to about 25% by weight hydrochloric acid. It is considered particularly desirable to use either a 14.4N solution of sulfuric acid or a 6N solution of hydrochloric acid because such concentrations are effective in reacting with the alumina as described without attacking the mineral complexes desired in the final product when this second digestion is carried out as herein described.

The amount of the mineral acid solution used should be course be sufficient to place substantially all of the free or loosely combined alumina in solution. This may be easily calculated on a stoichiometric basis after an appropriate analysis is made of the particles being treated. As a practical matter, it is considered suitable in most circumstances to utilize from about 3.6 to about 4.4 volumes of the acid solution and preferably about 4 parts of the acid solution per volume of the paste like particles present. This amount of acid is normally effective for the intended purpose.

The reactions involved in placing alumina values in solution are of the usual time-temperature category. If the temperature is too low the removal of the alumina from the process solids will be undesirably slow while if the temperature is too high there is danger of the acids used causing unnecessary complications and, of course, there will be the collateral problem of the cost of heating the reactants. For these reasons it is considered desirable to carry out the removal of the alumina at a normal ambient temperature within the range of from about 18° to about 40° C.

The time required to affect adequate removal of the alumina values during such treatment will normally vary from about 24 to about 72 hours depending upon various factors as are indicated in the preceding discussion. The use of a longer period will, in effect, be uneconomic because at the end of the 72 hour period noted normally substantially all uncombined or loosely combined alumina values will be in solution as a result of reactions as indicated. If a shorter period is used not all of such alumina will be removed from the particles being treated in the process. During this time period in connection with this digestion some of the salts formed may crystallize on the particles present. This is unimportant because they can be easily removed by washing.

Such washing normally forms a part of the next step of the process in the treatment of the solids. This next step involves separating the acidic process solution from the particles present in a conventional manner as, for example, through the use of another centrifuge. The solids remaining in the centrifuge normally should be washed to remove any such salts or any other carry-over type contaminants. At the end of the washing cycle the resultant washed particles will normally be removed from the centrifuge and dried at an elevated temperature which is sufficiently low so that no chemically combined or bound water will be removed from such particles. Normally, this can be accomplished through the use of any standard or conventional drier operating generally within the range of from about 100° to about 250° C.

The product resulting after this last step is capable of being directly utilized in many different applications as either an adsorbent or as an absorbent or as both. This product is considered to be sort of a general purpose adsorbent, absorbent which may be effectively utilized in removing discoloration and contaminants from both mineral and vegetable oils, from ethanolic beverages and the like. It is considered to be particularly more effective in such utilizations than prior known, closely related products.

I claim:

1. A process for treating sericitic clay particles so as to produce silica gel and an adsorbent, absorbent product which comprises:

removing silica from said particles by digesting said particles with an alkali solution under such conditions that the alkali and the silica react to form a soluble alkali silicate process solution, separating said process solution from the particles remaining after the digestion of said clay particles, bleaching said process solution so as to remove discoloration from said process solution, forming an alkali silicate gel from the bleached process solution by adding a gel forming reagent to it, separating the gel from the solution within which it is formed, drying the resultant gel, removing alumina from the particles remaining after the removal of silica by digesting them with a mineral acid under such conditions that the acid and the alumina react to form a salt of the acid which dissolves in the solution present, separating and drying the particles remaining after this second digestion.

2. A process as claimed in claim 1 wherein:
said clay particles are of a −150 mesh standard Tyler screen size, and
said alkali is sodium hydroxide, and
said acid is an acid selected from the group consisting of hydrochloric and sulfuric acids.

3. A process as claimed in claim 1 wherein:
said clay particles are of a −325 mesh standard Tyler screen size,
said removal of silica is carried out by digesting said particles with a solution containing from about 1 to about 4% by weight of sodium hydroxide at a temperature of from about at least 70° C. to about 100° C. for a period of from about 2 to about 10 minutes,
said bleaching is carried out by electrolyzing the process solution being bleached so as to produce oxygen and hydrogen within it for a time sufficient to remove substantially all discoloration from this process solution,
said bleached process solution is gelled by adding a mineral acid as a gel forming reagent to it in an amount sufficient to acidify said bleached process solution.

4. A process as claimed in claim 3 wherein:
said acid added as a gel forming reagent is sulfuric acid and is added in an amount sufficient to lower the pH of the solution to which it is added to within the range of from about 3 to about 6,
said solution containing the gelled process solution is neutralized by the addition of ammonia prior to said gel being separated so as to form within the solution containing said gel and ammonium sulfate.

5. A process as claimed in claim 4 wherein:
said gel is formed by stirring said acidified process solution at a normal ambient temperature for a period of from about 40 to about 60 minutes, said ambient temperature being within the range of from about 18° to about 40° C.

6. A process as claimed in claim 3 wherein:
said alumina is removed from said particles by treating said particles with a hydrochloric acid solution containing from about 12 to about 25% by weight of hydrochloric acid in an amount of from about 3.6 to about 4.4 volumes of said acid per volume of said particles for a period of from about 24 to about 72 hours at a temperature of from about 18° to about 40° C.

7. A process as claimed in claim 6 wherein: said alumina is removed from said particles by treating said particles with a 6N hydrochloric acid solution in an amount of 4 parts by volume of said solution per part by volume of said particles.

8. A process as claimed in claim 1 wherein:
said alumina is removed by digesting said remaining particles with a sulfuric acid solution containing from about 50 to about 90% by weight of sulfuric acid in an amount of about 3.6 to about 4.4 volumes of said acid per volume of said particles for a period of from about 24 to about 72 hours at a temperature of from about 18° to about 40° C.

9. A process as claimed in claim 8 wherein:
said alumina is removed by digesting said particles with a 14.4N sulfuric acid solution in the amount of 4 parts by volume of said solution per part by volume of said particles.

* * * * *

UNITED STATES PATENT AND TRADEMARK OFFICE
CERTIFICATE OF CORRECTION

PATENT NO. : 4,565,794
DATED : JANUARY 21, 1986
INVENTOR(S) : FRANCIS DE BUDA

It is certified that error appears in the above-identified patent and that said Letters Patent is hereby corrected as shown below:

Column 1, line 59, "seritic" should be —sericitic—.
Column 3, line 46, "referred" should be —preferred—.
Column 4, line 38, "treated as" should be —treated so as—.
Column 6, line 17, "be" first occurrence should be —of—.
Column 8, line 16, "and" should be deleted.

Signed and Sealed this

Twentieth Day of May 1986

[SEAL]

Attest:

DONALD J. QUIGG

Attesting Officer

Commissioner of Patents and Trademarks